(12) United States Patent
Brown

(10) Patent No.: US 7,589,506 B2
(45) Date of Patent: Sep. 15, 2009

(54) SIGNAL-TO-NOISE IMPROVEMENT FOR POWER LOSS MINIMIZING DEAD TIME

(75) Inventor: James Steven Brown, San Pedro, CA (US)

(73) Assignee: International Rectifier Corporation, El Segundo, CA (US)

( * ) Notice: Subject to any disclaimer, the term of this patent is extended or adjusted under 35 U.S.C. 154(b) by 173 days.

(21) Appl. No.: 11/555,955

(22) Filed: Nov. 2, 2006

(65) Prior Publication Data

US 2007/0096709 A1   May 3, 2007

Related U.S. Application Data

(60) Provisional application No. 60/733,281, filed on Nov. 3, 2005.

(51) Int. Cl.
G05F 1/40 (2006.01)
G05F 1/56 (2006.01)

(52) U.S. Cl. .................................. 323/271; 323/282

(58) Field of Classification Search ............. 323/222, 323/223, 225, 268, 271, 282–285
See application file for complete search history.

(56) References Cited

U.S. PATENT DOCUMENTS

| | | | |
|---|---|---|---|
| 5,268,830 A | 12/1993 | Loftus, Jr. | |
| 5,777,461 A * | 7/1998 | Massie et al. | 323/282 |
| 6,614,208 B2 * | 9/2003 | Narita | 323/283 |
| 7,184,281 B2 * | 2/2007 | Ren et al. | 363/24 |
| 7,294,992 B2 * | 11/2007 | Yoshikawa | 323/222 |
| 2005/0184716 A1 | 8/2005 | Brown | |

OTHER PUBLICATIONS

International Search Report issued Mar. 26, 2008 in corresponding PCT Application Serial No. PCT/US06/42996.

* cited by examiner

*Primary Examiner*—Matthew V Nguyen
(74) *Attorney, Agent, or Firm*—Farjami & Farjami LLP

(57) ABSTRACT

Apparatus for minimizing power losses associated with dead time between ON times of two series connected switches of a power converter connected across a supply potential, the apparatus comprising a control arrangement for monitoring a selected parameter associated with power loss during the dead time of the converter; the control arrangement changing the dead time from a first dead time to a second dead time and comparing the selected parameter associated with power loss for the first and second dead times and determining which of the power losses associated with the two dead times is smaller; a dead time implementing stage for implementing the two dead times; and the control arrangement selecting the dead time associated with the smaller power loss and providing a signal to the dead time implementing stage to set the selected dead time, wherein the control arrangement comprises a module sampling a signal related to the selected parameter associated with power loss at selected instants in time corresponding to the first and second dead times; and a processor for controlling timing of the sampling; and further comprising a comparator module for comparing power loss associated with the first and second dead times and for providing a signal indicating which dead time is associated with a smaller power loss and providing said signal to said processor to implement the dead time associated with the smaller power loss; further comprising an error compensating circuit coupled to said sampling module and to said comparator to reduce offset errors, introduced by either or both said sampling module and said comparator module. Also described is an apparatus to prevent trapping at sub-optimal dead times and for compensating for coherent load transients.

26 Claims, 12 Drawing Sheets

SIGNAL-TO-NOISE IMPROVEMENT FOR POWER LOSS MINIMIZING DEAD TIME

CROSS-REFERENCE TO RELATED APPLICATIONS

This application claims the benefit and priority of U.S. Provisional Application 60/733,281 filed Nov. 3, 2005 entitled SIGNAL-TO-NOISE IMPROVEMENT FOR POWER LOSS MINIMIZING DEAD TIME, the entire disclosure of which is incorporated by reference herein.

BACKGROUND OF THE INVENTION

The present invention relates to minimizing power loss associated with the dead time of switching power supplies.

In U.S. patent application Ser. No. 11/058,969, filed Feb. 16, 2005, the entire disclosure of which is incorporated by reference herein, a method and apparatus for minimizing the power loss associated with the dead time of switching power supplies is described. In a switching power supply, for example, a switching converter, two control switches are typically employed, one of which operates as a synchronous rectifier. The two switches are generally controlled so that both switches are never on at the same time. A "dead time" is provided between the on-times of the two switches to prevent cross conduction across the DC voltage supply between which the two switches are connected in series.

In the prior patent application, a method is described in which a selected parameter associated with the power loss during the dead time is monitored. The selected parameter may be the duty cycle of a pulse width modulated (PWM) control signal adapted to drive a control terminal of at least one of the switches or the error signal from an error amplifier driving the PWM modulator, as disclosed in FIG. 1A of related U.S. Pat. No. 7,098,640. The entire disclosure of this patent is also incorporated by reference herein. In the system described, the control arrangement for the switches continually changes the dead time from a first dead time to a second dead time and compares the selected parameters and thus power losses for the first and second dead times and determines which of the power losses associated with the two dead times is smaller. A dead time implementing stage implements the two dead times and the control arrangement selects the dead time associated with the smaller power loss and provides a signal to the dead time implementing stage to set the selected dead time.

A fundamental element of a successful power loss minimizing dead time (PLMDT) scheme is to find the dead time corresponding to the minimum power loss. The approach described above basically modulates the efficiency of the synchronous power converter with the change in dead time and then synchronously demodulates the results for processing to make decisions about which dead time is best. Several practical limitations impede this process by effectively producing a "noise" which must be overcome for the power loss minimizing dead time (PLMDT) algorithm to operate successfully. These practical limitations include:

Instrumentation Errors

For an analog signal processing scheme, the offset errors of any amplifiers and comparators must be overcome by any differences in the acquired signal which are caused by power loss. Since the signal size can be in the mV range, it is evident that offsets of 1 mv or lower are desirable. In the PLMDT scheme, a sample and hold (S&H) circuit may be used together with a comparator to store the prior power loss sample and the present one and compare the two to determine which is "better", or which represents a lower power loss. For economic reasons it is desirable for the sample and hold (S&H) capacitor of the S&H module to be tied to the power loss decision comparator input. In the case of a S&H circuit, low input bias and offset current are desirable. Low input bias/offset currents and low input offset voltage are conflicting requirements that can make this circuit difficult to implement in an economical way.

Local Power Loss Minima

The response of power loss as a function of dead time is not necessarily monotonic over the full range of the dead time modulator. This can cause some implementations to get trapped at sub-optimum dead times, sometimes far away from the optimum dead time.

Transient Loads

During steady state load conditions, all the changes in power loss are a function of PLMDT operation at its sample frequency of change. When the load varies, this variation gets superimposed on the modulation caused by the deliberate changing of dead time. If the load varies in a very random way, simple averaging can eliminate this undesirable signal, even if it is large (often the case). If the load varies in a coherent manner, however, this "false" signal can overwhelm the desired signal if its frequency is near the PLMDT sample frequency or harmonic/sub-harmonic. This can cause erratic or even destructive operation.

SUMMARY OF THE INVENTION

The present invention relates to improvements in the power loss minimizing dead time scheme described in the above-identified patent application and patent. In particular, it provides areas of improvement to the PLMDT method and apparatus. These are as follows.

Reduction of Instrumentation Errors

PLMDT can be implemented with either analog or mixed signal implementation of power loss acquisition. Typically power loss will be inferred through duty factor, which in turn may be inferred by the error amplifier output. See FIG. 1A of U.S. Pat. No. 7,098,640. Whether mixed signal or analog implementation, the accuracy of the measurement is not important, but the resolution and short term repeatability of the measurement is important.

Typical resolution and short term repeatability combined should be on the order of 1 mv or less. Repeatability should be over the period of at least two settle delays which may be in the order of a couple of milliseconds.

In mixed signal implementations, a signed accumulator can be used to store the difference between the test and previous best power losses. This is not possible with a pure analog implementation, but results in very significant improvement in operation. The implication of this, however, is that short term repeatability must be maintained for "N" tests. In an actual implementation, 256 tests have been employed. In practice, maintaining repeatability for about 1 second or less should not pose a challenge in a mixed signal implementation which is significantly more time than the few milliseconds that would be employed in an analog implementation.

For a mixed signal solution, enough bits are required to achieve adequate resolution so that the analog elements of the converter have the requisite short term repeatability. Analog repeatability is over such a short period that it typically will not be an issue.

For an analog solution, like the mixed signal one, repeatability should not be a practical concern. The resolution problem distills down to the offset of the comparator used to make the Better/Worse decision regarding power loss. That offset effectively is the resolution of the measurement since any dead time related change in error voltage may have to overcome that offset to change the decision outcome.

This invention effectively achieves better than one mV resolution using FET differential pairs with offsets of 15 mV or more while maintaining extremely low input leakage so that it can also act as the S&H input.

Overcoming Local Power Loss Minima

The power loss benefits near the optimum dead time setting are significant, but the change from any one dead time setting to the one nearest to it can be so small as to be undetectable or even reversed from the general trend by a very small amount. An artifact of this is that a PLMDT algorithm that only tests dead time values to either side of its current "Best" can get trapped at a setting far away from the optimum.

To solve this problem, this invention checks all possible dead times. Any time a better one is found (lower power loss), the PLMDT algorithm moves to that new dead time setting and continues checking all other values. It also incorporates a method for reducing the amount of time spent testing sub-optimum dead times, providing an escape algorithm, so that overall power loss savings can be maximized.

Reducing the Effects of Coherent Load Transients

After each change in dead time, it is advantageous to allow the power supply feedback loop to settle before trying to determine the power loss associated with the new dead time. This delay must be extended to allow settling of any measurement circuitry used to determine the power loss.

This delay, combined with the repetitive nature of the PLMDT operation, sets the sample rate of overall PLMDT operation. A large number of samples are taken before a single PLMDT decision is made. This effectively allows random load transients to be eliminated from the decision. In the case of a coherent load transient, depending on the sample frequency and load transient frequency, it is possible for the load transient changes to cause every single reading to be "Better" or every one to be "Worse".

One solution to this problem is to incorporate a pseudo-random timing element into the settling delay of the basic PLMDT algorithm using a linear feedback shift register (LFSR). Other detailed solutions are possible, such as developing a digital random source from an analog white noise source such as a zener junction.

In any case, the fundamental principle of the invention is to spread the synchronous modulation and detection of the PLMDT circuit over a very wide spectrum so that interference on any narrow part of that spectrum only has a very fractional effect on the overall outcome.

While it is conceptually possible for a load transient to have exactly the same pseudo-random sequence of a LFSR, this is statistically unlikely, as long as the LFSR sequence is a reasonable length.

Furthermore, although this application shows embodiments where the converter circuits are pulse width modulated, the principles of the invention can be applied to other modulation schemes, including pulse frequency modulation (PFM) as well as others. It is noted that the actual modulation scheme is not significant with respect to schemes for implementing PLMDT. Any modulation scheme could be employed.

Other objects, features and advantages of the invention will be apparent from the detailed description which follows.

BRIEF DESCRIPTION OF THE DRAWINGS

The invention will now be described in greater detail in the following detailed description with reference to the drawings in which:

FIG. 1A shows signal waveforms in the circuit of FIG. 1;

DETAILED DESCRIPTION OF PREFERRED EMBODIMENTS OF THE INVENTION

Figure 1:
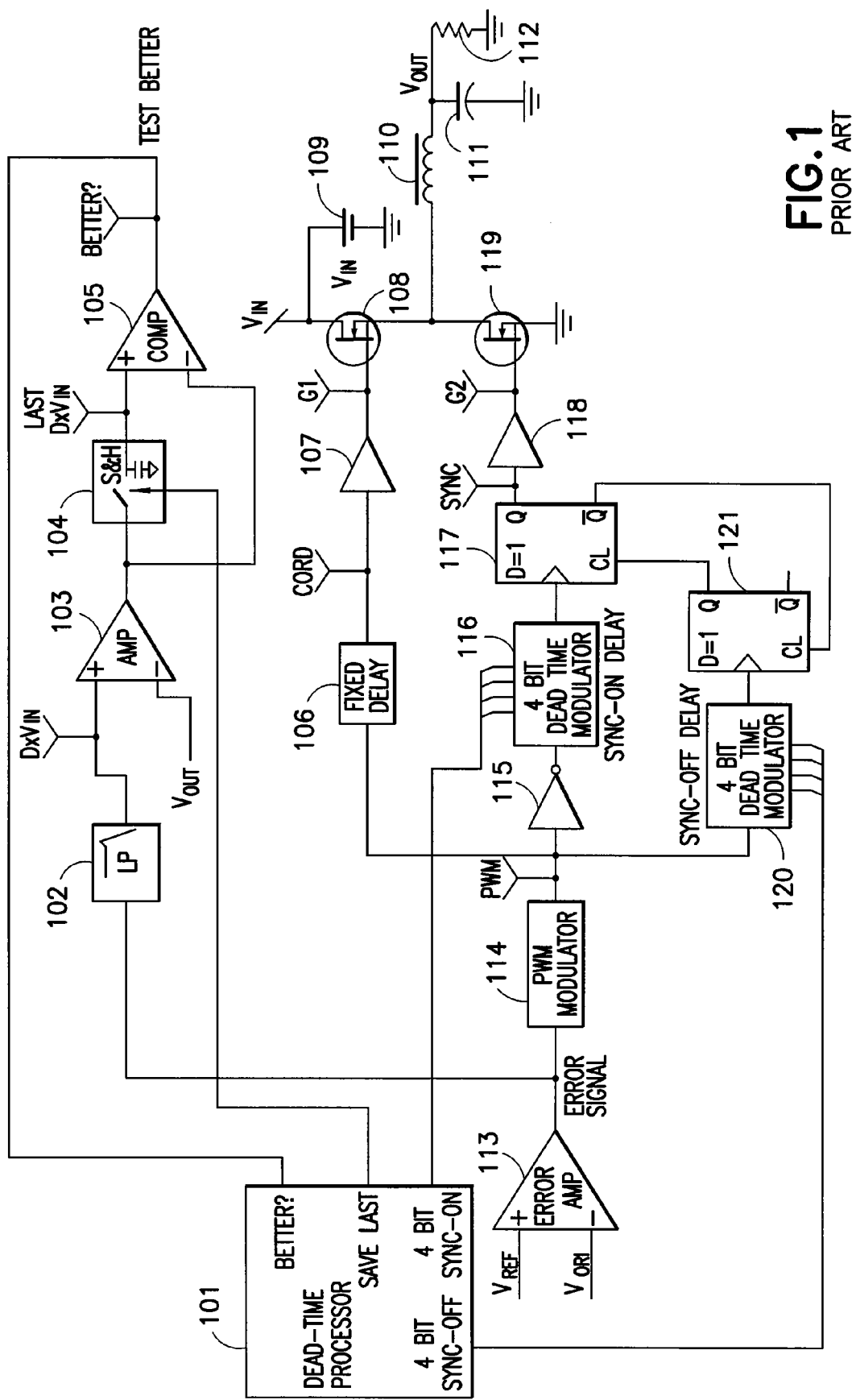
FIG. 1A shows a prior art switching converter implementing a power loss minimizing dead time stage and is also shown in FIG. 1A of U.S. Pat. No. 7,098,640.

With reference now to the drawings, FIG. 1 shows a simplified implementation of the PLMDT algorithm. In this analog implementation, the error signal from the error amplifier 113 driving the PWM modulator 114 is used as an indicator of power loss. This is described with reference to FIG. 1A of U.S. Pat. No. 7,098,640. A PWM oscillator, which is included in the PWM modulator 114, is assumed to operate at 1 Mhz, that is, having a one microsecond period for the example circuits given. Any other frequency can be used. The reader is referred to FIGS. 4 and 5 and accompanying description of U.S. Pat. No. 7,098,640 for a general discussion of the power loss minimizing dead time algorithm as well as FIG. 1A of that patent which describes the power loss minimizing dead time algorithm and circuit wherein the output of the error amplifier is monitored as an indication of power loss during dead time.

FIG. 1 shows a DC-DC converter circuit that incorporates the PLMDT technique. The circuit employs PLMDT on a periodic basis to optimize and update the dead times. The converter includes two switches 108 and 119, typically MOSFETS, connected in series between the power supply nodes, $V_{IN}$ and ground. The converter is shown as a buck converter, but the PLMDT scheme is applicable to any form of switching mode power supply with synchronous rectification.

Figure 1A:
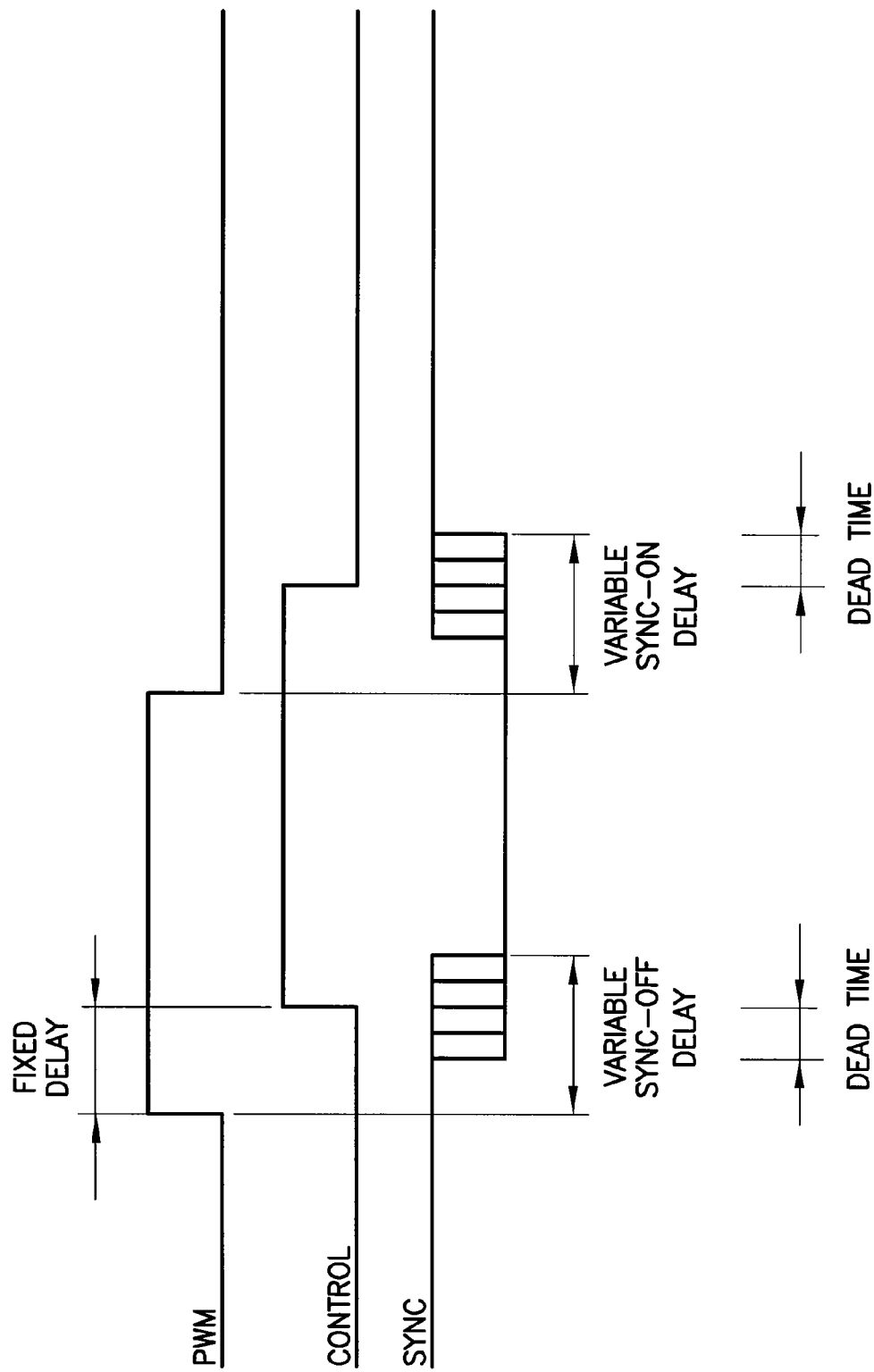

As well known, the switched node of a buck converter is coupled to the load through an output inductor 110. An output capacitor 111 is coupled across the load. The gate of each switch 108 and 119 is coupled to pulse width modulated (PWM) signals (CONTROL and SYNC, respectively) from a PWM controller 114 via gate drive circuitry 107 and 118 shown schematically. Additional circuitry between the PWM modulator and the gate drive circuitry accomplishes the PLMDT algorithm. Since the gate drive signals are complementary, an inverter 115 is shown in one of the gate drive channels. In a buck converter, switch 108 functions as the control switch and switch 119 functions as a synchronous rectifier. The PWM signal from PWM modulator 114 is generated in known fashion. The PWM signal is delayed by the fixed delay block 106. This allows the programmable dead time range to include both positive and negative values of dead time. The off time and on time of the synchronous switch 119 is varied, as shown in FIG. 1A, thus changing the amount of dead time. They sync-on delay is implemented, for example, via a four bit dead time modulator 116 which may comprise a counter, tapped analog or digital delay line or single shot circuit. Likewise, the sync-off delay is implemented by a similar modulator 120. They are programmed independently by the dead time processor 101 and allow independent adjustment of the sync-on and sync-off delay times.

In the circuit of FIG. 1, changes in duty factor of a PWM signal, as reflected in the output of error amplifier 113, are used to estimate power loss changes. The output of the error amplifier 113 can be used as an indication of duty factor and thus power loss. This is possible because the error signal is the modulation input to the PWM stage 114. Consequently, the PWM duty factor is proportional to the error voltage. The output of the error amplifier 113 is supplied to the PWM modulator to produce the PWM signal which drives the switches 108 and 119. It is also fed to a low pass filter 102 to produce a signal $D \times V_{IN}$, which is proportional to the duty factor. The low pass filter provides a slow moving signal which is equal to what the output voltage would be if there were no converter losses. The signal is amplified by an amplifier 103 and its output is provided on two paths. One path goes directly to the decision comparator 105 and the other path is through, for example, a sample and hold (S&H) module 104, before being applied to the decision comparator 105. The sample and hold module 104 saves the previous amplified $D \times V_{IN}$ signal so that it can be compared to the one produced after a change in dead time, where D=duty factor.

A sample and hold module 104 is shown in FIG. 1 but the sample and hold function can be implemented in various ways, including for example, using an analog to digital converter (ADC) and an N bit memory or other equivalent techniques. Similarly, the comparator function can be performed by a logic magnitude comparator, for example, or other equivalent techniques. The dead time processor 101 (DTP) of FIG. 1 may be implemented with logic circuitry, a microcontroller or a microprocessor. The DTP 101 controls the sample and hold circuit 104, sets the dead time via the dead time modulators 116 and 120 and processes the better signal from the output of the decision comparator. If the new signal related to power loss is smaller than the previous signal (last $D \times V_{IN}$), then the new dead time is "better" (the comparator output is high) and the DTP 101 saves the new dead time value. Otherwise the new one is discarded and the old dead time is restored. A delay is required after changing the dead time to allow the power supply feedback circuitry to settle on a new duty factor. Many factors can effect this time but in practice a time of about 100 times the switching period of the power supply seems to work well.

Though not necessary to demonstrate the principle, in practice the DTP preferably averages multiple decisions over a relatively long period of time before reaching a final conclusion about a particular dead time in order to obtain reliability and prevent false dead time setting due to noise or transients. Hundreds of samples or more are desirable. This effectively averages out the effect of rapid load transients on power supply duty factor. The same averaging technique is applicable if some other means besides duty factor is used to determine power loss.

PLMDT may be implemented using digital PWM or digital signal processing (DSP) implementations, but the basic algorithm remains substantially the same.

FIG. 1A shows waveforms of the circuitry of FIG. 1. The PWM signal shown as signal CONTROL is delayed by the fixed delay of delay module 106. The signal SYNC applied to the gate of the synchronous switch 119 has a variable sync-off delay and a variable sync-on delay as described above, thus determining the dead time between signals CONTROL and SYNC. The sync-off delay is determined by the DTP 101 and supplied as a four bit digital signal to the modulator 120. The output of modulator 120 is provided to D flip-flop 121, turning off the switch 119 at the variable delay. Similarly, modulator 116 turns on the switch 119 by setting D flip-flop 117 at the selected variable on delay. When flip-flop 117 output is high, switch 119 is turned on via driver 118. When flip-flop 117 output goes low, it clears flip-flop 121 so that flip-flop 121 will be ready to set at the next sync-off delay as determined by modulator 120. The fixed delay 106 in the control channel delays the control PWM signal a sufficient amount of time so that modulators 116 and 120 can, effectively, implement both positive and negative dead times in the synchronous channel, effectively allowing the synchronous turn-on and turn-off to be either delayed or advanced, as required to achieve the selected dead time.

Figure 2:
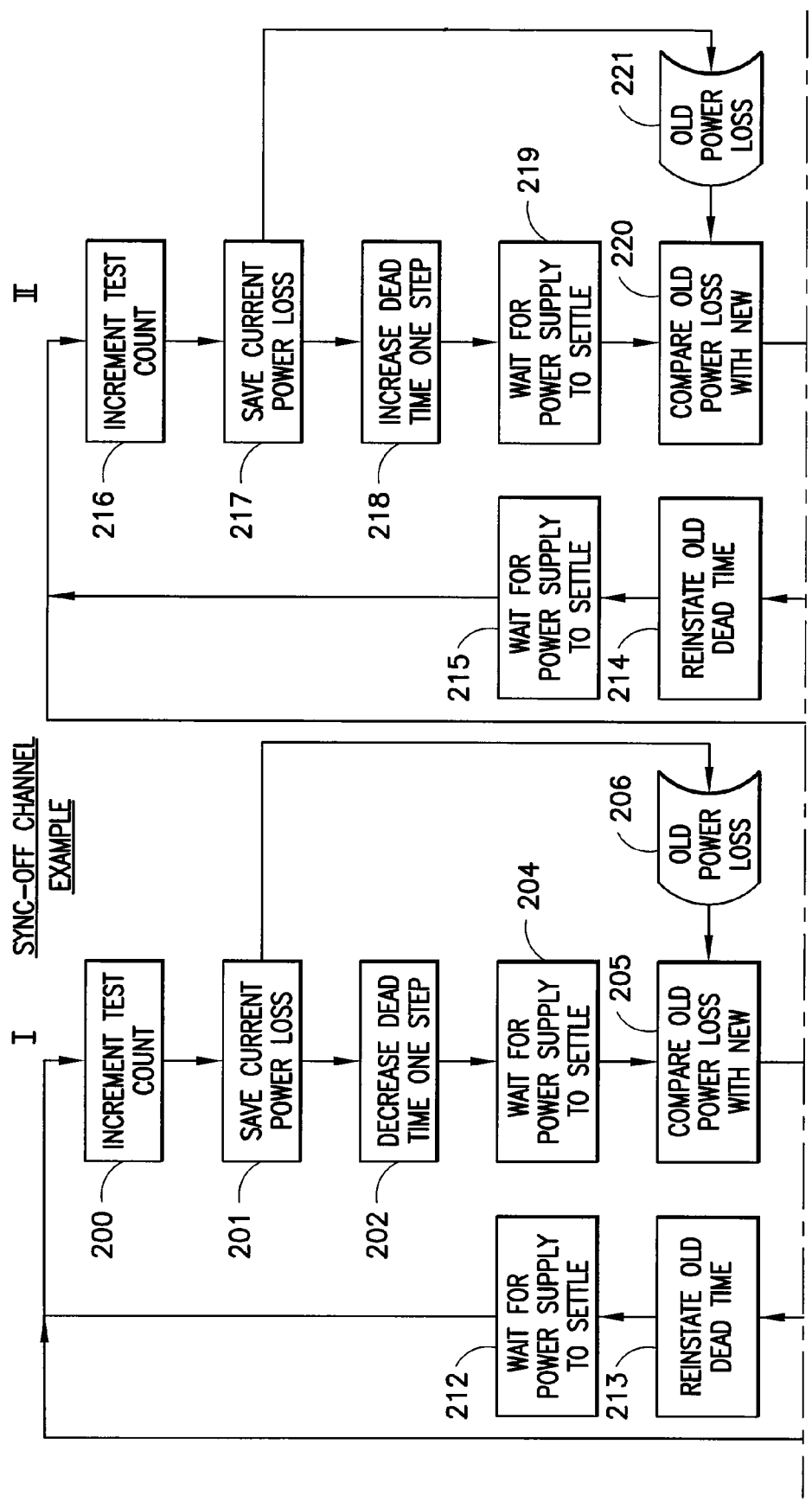
FIG. 2 shows an example of an algorithm for implementing power loss minimizing dead time, also described in FIG. 5 of U.S. Pat. No. 7,098,640.
Figure 2B:
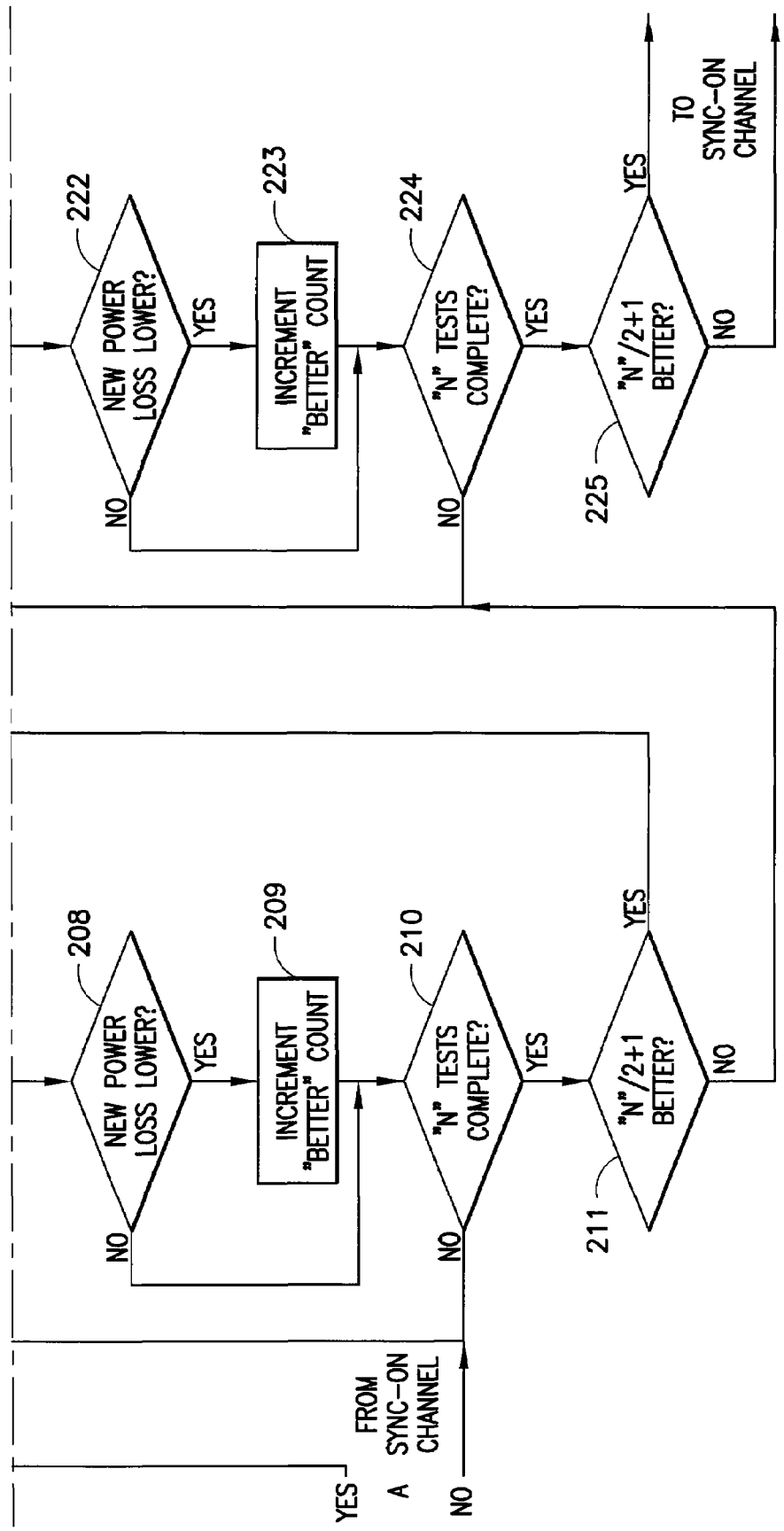

FIG. 2 is a flow chart of the prior art PLMDT scheme implemented by the circuit of FIG. 1. The basic algorithm can be implemented with a digital signal processor, microprocessor, microcontroller or logic state machine.

With reference to FIG. 2, only the flow for the sync-off channel is shown. As described below, the sync-on channel flow is substantially the same. Starting at A, assuming that the sync-off delay has been set and the result of the previous dead time was that the power loss resulting from the last dead time showed that the last sample was better than the previous sample, that is, resulting in a lower duty cycle and thus a lower power loss, entry into the flow is via YES at point A. A test counter that counts to N is incremented at 200. The current power loss is sampled and saved at 201. The dead time is shortened or decreased by one step as indicated at 202. This means the off delays increase since the dead time is decreased. See FIG. 1A which shows the PWM CONTROL and SYNC signals and the sync-off delay and sync-on delay as well as the dead times. As can be observed from FIG. 1A, when the off delay is increased, the dead time between the off time of the sync pulse and the on time of the control pulse is decreased. Whether the dead time is decreased or increased initially is arbitrary. However, since the goal is to decrease power losses and this is accomplished generally by decreasing dead time, dead time is preferably decreased initially. In the second part II of FIG. 2, dead time will be increased and the dead time that results in the power loss will be implemented.

A delay is implemented to allow the power supply voltage to settle as shown at 204. The new power loss (after the dead time has been changed) is now compared with the old power loss at 205. The old power loss has been saved from the step 201 as shown at 206. If the new power loss is lower (for example, as determined by duty cycle), as indicated by decision block 208, flow is to block 209 wherein the "better" counter is incremented. The "better" count keeps track of the number of times the new power loss is better than the old.

If the new power loss was not better than the old power loss at 208, the counter is not incremented. The flow is then to a decision block 210 to determine if N tests are complete. A plurality of tests are preferably made to obtain reliable results. If N tests are not complete, flow is to 213. At 213, the previous dead time is reinstated and a delay is implemented at 212 to allow the power supply to settle and the test counters incremented at 200 and the comparison is again made with the old power loss. Once N tests have been completed, exit is to 211. The dead time will have been last implemented at step 202 and tests are made to ensure that the comparisons are reliable, to account, for example for noise or load transients, which could cause an error if only a single test were made. By making multiple tests, greater accuracy and reliability are obtained. At step 211, a determination is made if N/2+I of the tests were better, that is, if the "better" counter shows that more than half the tests made showed a better power loss. If so, then entry is made into Part II of the flow. If N/2+1 were not better, then the old dead time is reinstated at 214 and a delay is implemented at 215 before proceeding to step 216.

At step 216, the test counter N is again incremented. The current power loss is saved at 217, the dead time is increased by one step at 218 reducing the sync-off delay. At 219, a delay is implemented to allow the power supply to settle. At 220, the old power loss saved at step 217 is compared with the new power loss. The old power loss is shown at 221. At step 222, a determination is made as to whether the new power loss is lower with the increased dead time. If the new power loss is lower, the "better" counter is incremented at 223. If the new power loss is not lower, or after incrementing the "better" counter at 223, a check is made to determine if N tests have been completed. If not, a return is made to step 214 and the test counter is incremented again at 216 and the comparison at 220 is again made. Once N tests have been completed at step 224, a check is made at 225 to determine that more than half of the N tests were better. If this is the case, then the flow is to the synchronous on channel flow which is substantially identical to the synchronous off channel example shown in FIG. 2. The synchronous on channel dead time delay will be processed in the same way as the synchronous off channel example shown in FIG. 2. Accordingly, in the synchronous on channel, a similar flow will occur in that the old power loss will be compared with the new power loss for both a decrease and an increase in the dead time, and if the power loss is better, the new dead time will be maintained and if not, the old time will be restored, substantially in the same way as shown in the synchronous off channel of FIG. 2.

As described above, the PLMDT algorithm suffers from three sources of errors including instrumentation errors, trapping at local power loss minima and erratic or possibly destructive operation due to coherent transient loads.

In order to reduce these errors, the present invention modifies the PLMDT algorithm and circuitry in the following ways.

Reduction of Instrumentation Errors

Offset errors introduced by S&H 104 and Comparator 105 translate directly into errors in detecting minimum power loss because the power loss indicator from the previous "Best DT" follows a different signal path than that associated with the "TestDT" value, where DT—dead time. For example, if the combined offset of the S&H and the comparator are 10 m V, the change in the power loss signal would have to be greater than 10 m V to overcome that error.

In order for PLMDT to properly operate, the absolute magnitude of the power loss measurement is unimportant. What is important is the relative measurement between the previous best value and the new test value. The previous best value is the baseline, and the important thing is to detect the relative shift from that baseline, either better, worse, or same. An adequate number of "better" results are necessary to validate a new "best" dead time setting.

Figure 3:
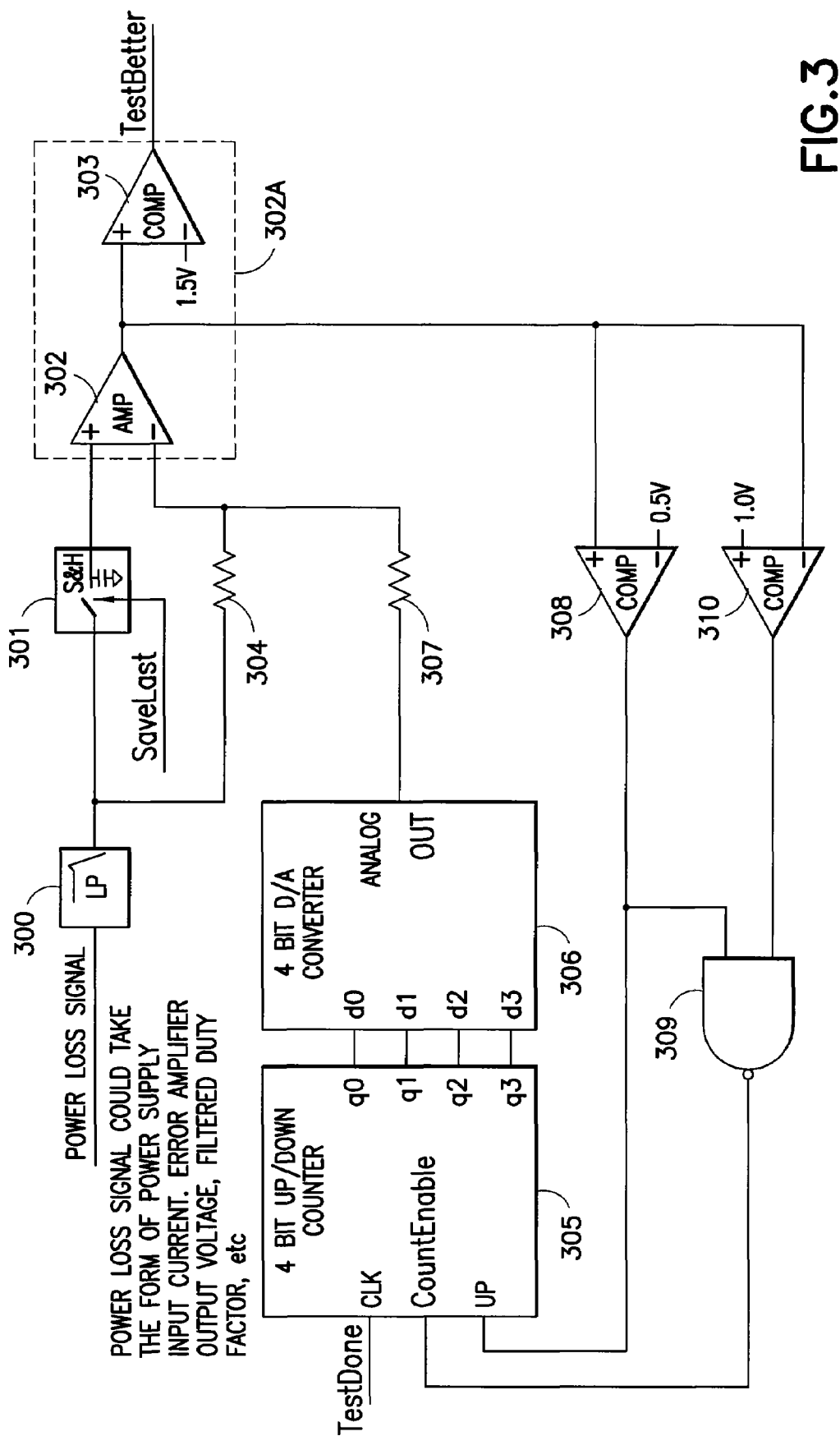
FIG. 3 shows a modification of the circuit of FIG. 2 according to the invention which cancels out errors produced by the sample and hold circuit and comparator.

The circuit of FIG. 3 satisfies this requirement by canceling out errors produced by S&H circuit and "comparator" shown here as S&H 301 and amplifier 302 and comparator 303. The reason the comparator 302, 303 is schematically shown as an amplifier (op-amp) will soon be evident. The ultimate goal is a valid "TestBetter" signal, either true or false. As should be understood, the comparator 105 of FIG. 1 is replaced in the circuit by a comparator module 302A comprising the amplifier 302 and comparator 303.

In the embodiment shown, which is merely illustrative, comparator 303 requires a signal greater than 1.5V for a TestBetter result. The circuit shown will apply a correction to amplifier 302 via resistor 307 such that the output voltage of the amplifier 302 will fall between 0.5V and 1.0V when the SaveLast signal is true, i.e., when a sample is taken. In this way any offset errors introduced by components 301 or 302 will be canceled in relation to the gain of amplifier 302. Assuming a gain of 10,000, and knowing the output with errors canceled is between 0.5V and 1.0V, the offset will be between 50 µV and 100 µV.

The error canceling bias may be provided via D/A converter 306, which is in turn controlled by the output of up/down counter 305. Counting direction (plus or minus) runs opposite of the required direction because the signal is summed into the negative input of amplifier 302.

If amplifier 302 output is too low (<0.5V), comparator 308 commands count down. If it is too high (>1.0V), comparator 308 commands count up. If it is between 0.5V and 1.0V, NAND gate 309 commands disable of counting. External logic (not shown) prevents counter 305 from under or over range conditions.

Other implementations besides that of FIG. 3 are possible. The essential element of the present invention is that offset errors are canceled, allowing inexpensive IC or discrete implementation without regard to the presence of high S&H or comparator offsets.

Overcoming Power Loss Local Minima

Figure 4:
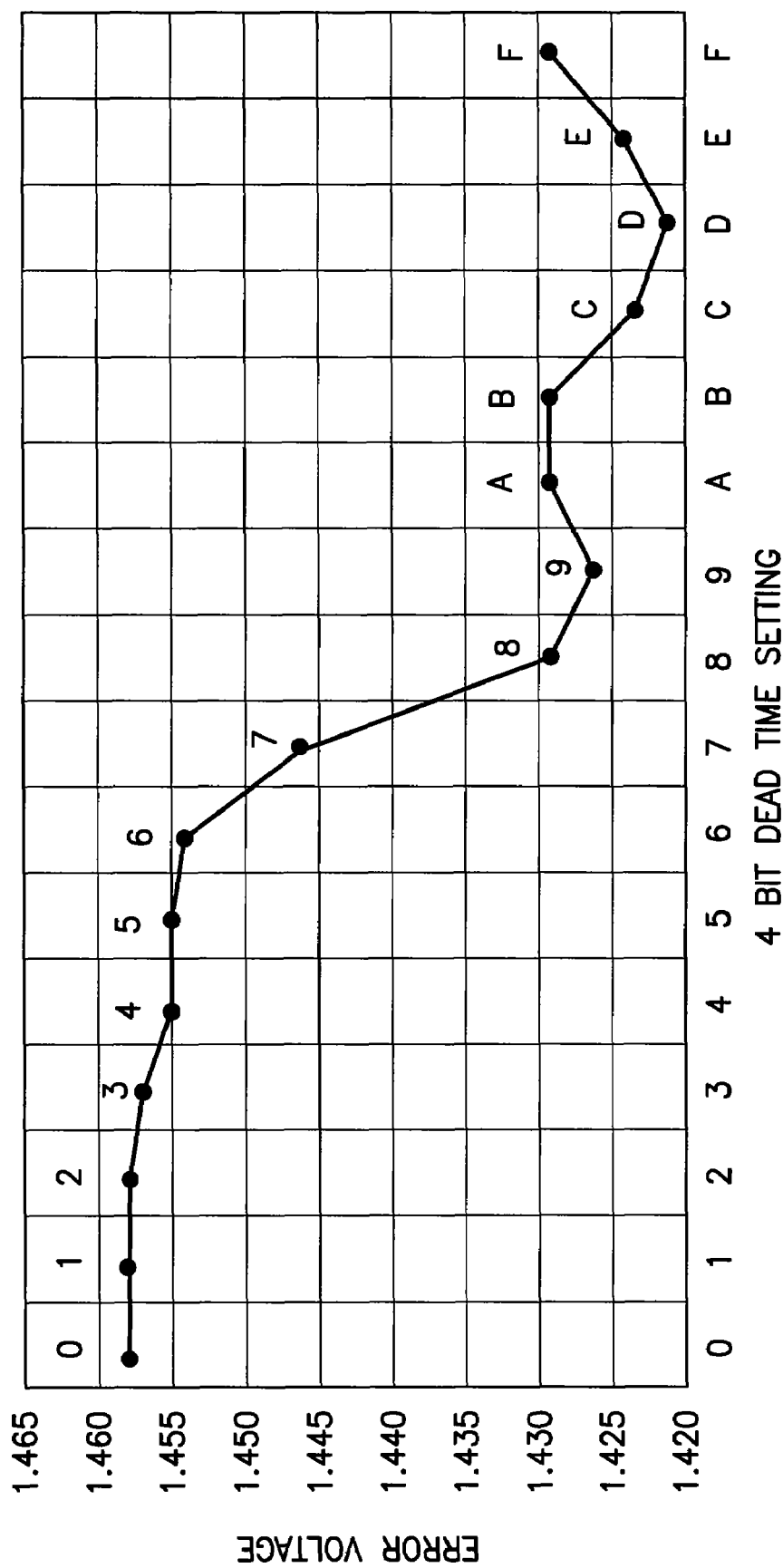
FIG. 4 shows an example of how the power loss minimizing dead time algorithm can become trapped at a dead time setting in order to explain how the invention overcomes this trap.

In the example flow chart of FIG. 2, and in particular at 202 and 218, dead time values are only tested one lower and one higher than the current Best dead time. This approach carries the possibility of getting stuck at sub optimum dead time settings. FIG. 4, a plot of dead time setting verses duty factor ×5V, illustrates this effect. Settings "9" & "D" are both minima, but D is the overall minima. There is a possibility of the algorithm of FIG. 2 getting trapped at DT setting "9" (FIG. 4)

In order to solve this problem, it is necessary to allow testing of DT values far away from the current best value. All dead time settings must be testable from every "Best" location. This is implemented in FIG. 5 at 517 by incrementing the test count every time through the PLMDT cycle. Once the maximum count is reached, such as at F (hexadecimal) (15 in decimal) in FIG. 4, the counter rolls over to 0 and starts again.

In the following explanation various numerical values are given for the number of tests (256), the number of "better" decisions before conclusion (160), etc. These are exemplary only as the algorithm is not tied to any particular number, except that it should always be greater than one half of the number of tests (>N/2) for it to be "better."

When a particular DT setting tests better than the current best, the DT setting can be changed to that new best. Alternatively, as at 512, when a particular DT setting tests better than the current best, the DT can be moved one closer to the new value. In practice this tends to give more stable and reliable results.

The draw back of this algorithm is that it spends a lot of time testing DT values far away from the optimum. This results in average power losses being strongly influenced by the "bad" DT settings. In order to minimize the time spent testing suboptimum DT values, two methods are employed in FIG. 5 which can result in early escape from testing suboptimum DT values. In each of these the exact numbers used can be changed. The principle is to allow early escape from suboptimum DT values. Steps 501 & 502 allow early escape if at least half of the first 16 tests are not "Better". Since in the embodiment shown 62.5% (see step 511—160 Tests Better) of the readings must be good in order for a new DT to be accepted, if at least 50% are not good during the first 16 (of 256 via step 515) the trend is not encouraging. The number chosen for explanation in FIG. 5, i.e., 160 better tests, is merely explanatory. Other numbers can be used, and the total number of tests (256, see step 516) can also be different.

It is evident that due to load transients this early test could fail in a situation that may ultimately result in 160 better readings if it were allowed to continue. Nevertheless, the loss penalty for temporarily staying at a suboptimum value is less than that of testing an even worse value 256 times.

A second escape is provided at step 503, which provides for escape if 160 better is no longer mathematically possible. There is no penalty for this early escape.

In mixed signal implementations, a signed accumulator can be employed to keep a running total of the numerical difference between the power loss associated with the two dead times, the one under test and the previous best dead time associated with lowest power loss. The numerical summation of "worse" power loss readings, i.e., where power loss is greater, is then used to force a restart of the counting sequence (i.e., for the power loss tests) if it exceeds a preset value.

Reducing the Effects of Coherent Load Transients

Figure 5:
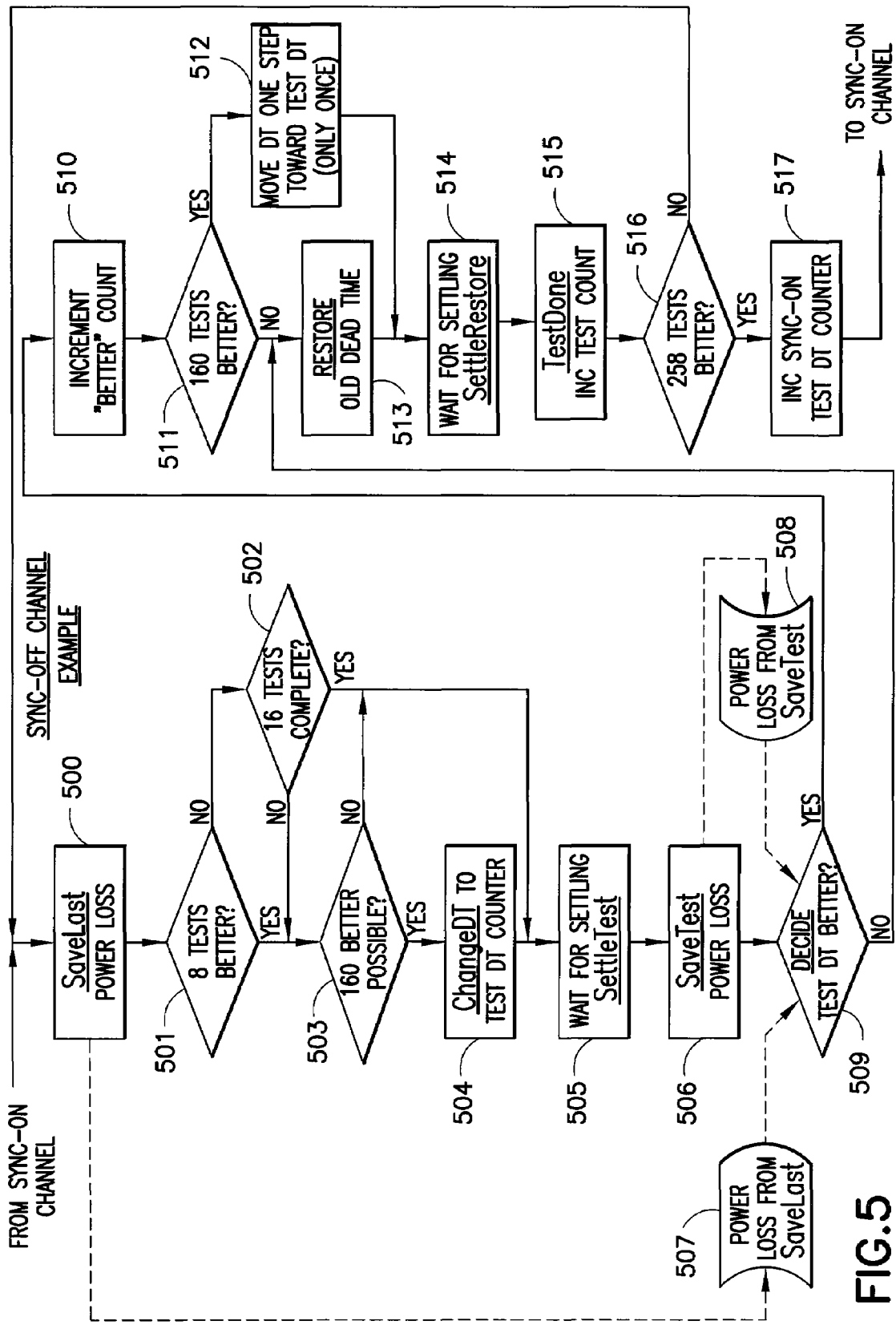
FIG. 5 shows a modification of the power loss minimizing dead time algorithm to allow an early escape from a sub-optimal dead time trap.
Figure 6:
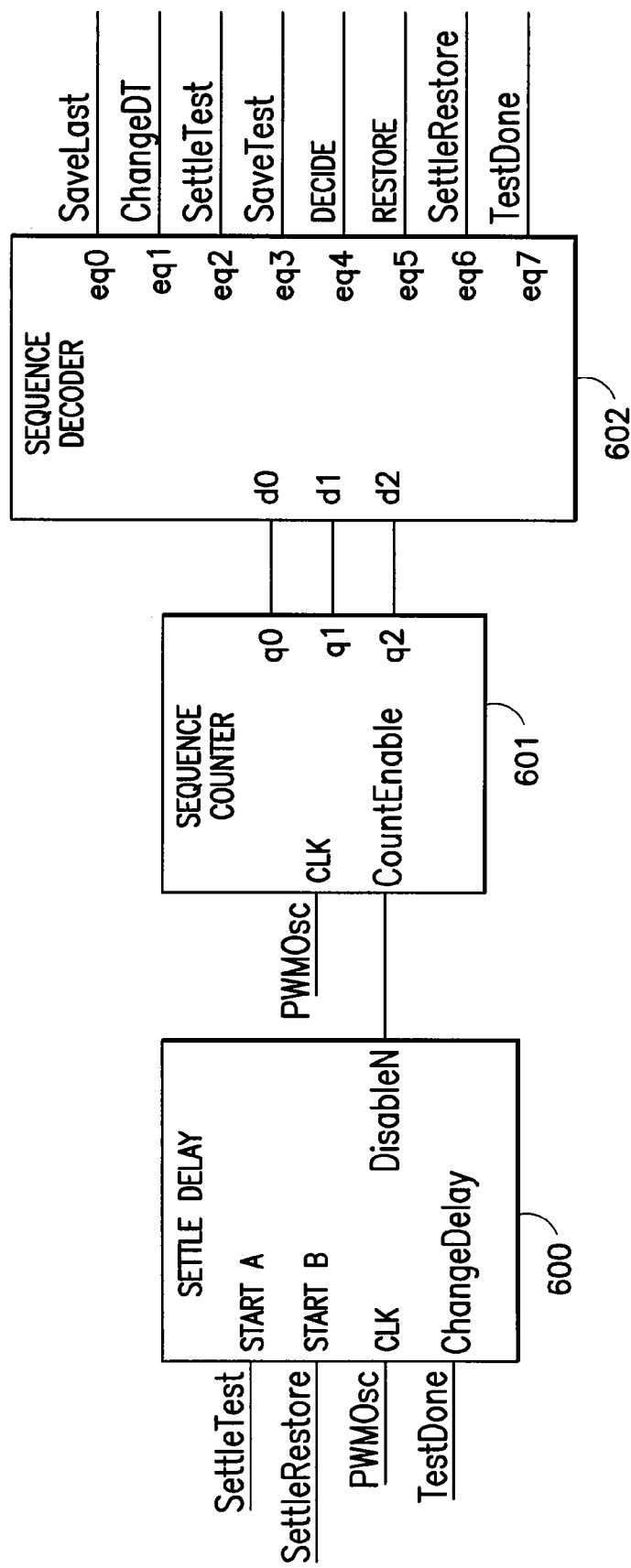
FIG. 6 is a simplified representation of a state machine used to implement power loss minimizing dead time.
Figure 6A:
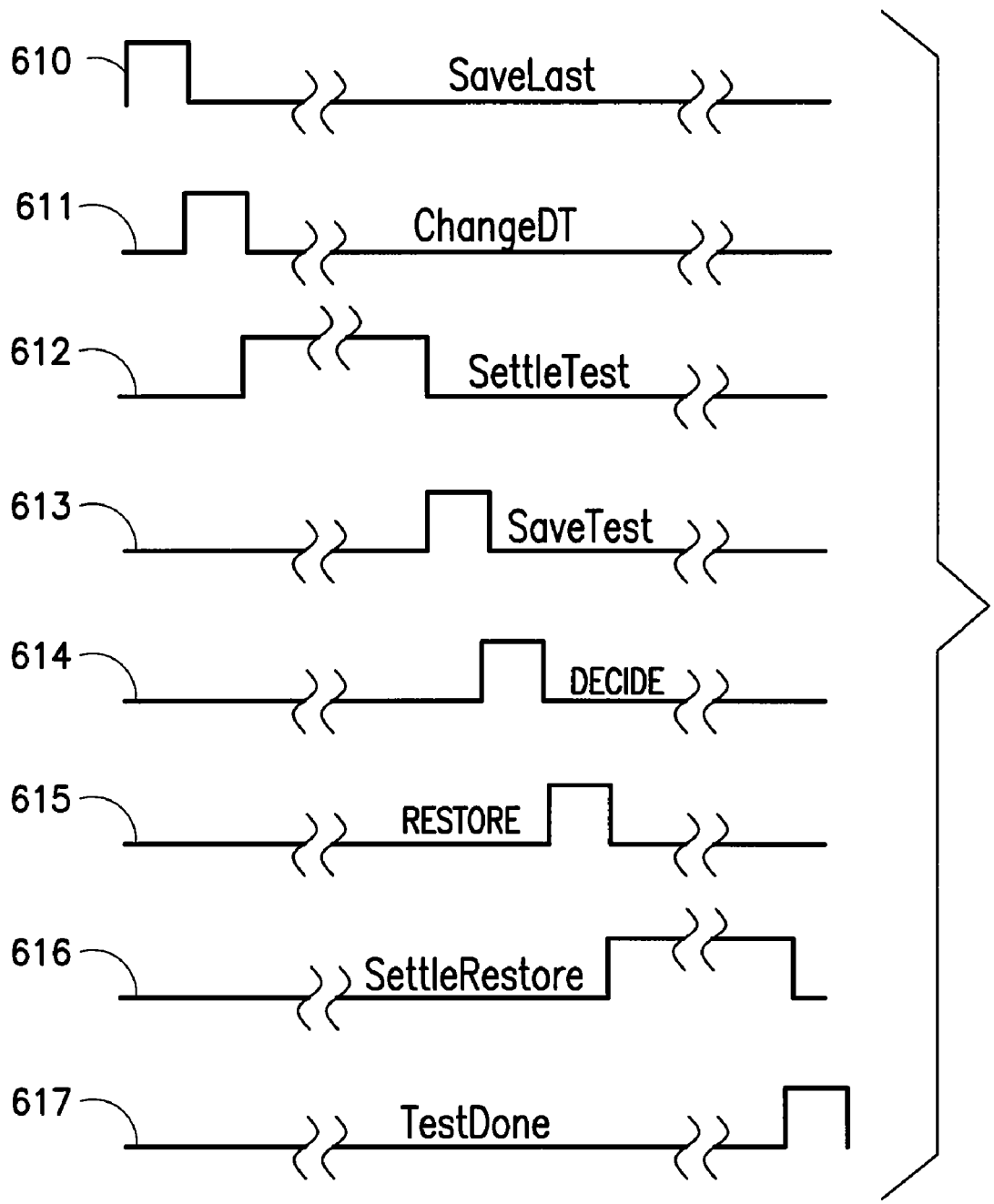
FIG. 6A is a timing diagram associated with FIG. 6.

FIG. 6 is a simplified representation of a state machine used to implement PLMDT. Waveforms 610 through 617 of FIG. 6A are a timing diagram associated with the state machine. FIG. 5 and FIG. 6 relate together in that the notations formatted with bold underline in FIG. 5 correspond to the sequence decoder states (602) of FIG. 6. For example, see steps 505 & 514 and 602, 612, & 616. In general the sequence decoder advances one state for each PWM oscillator cycle. During the SettleTest and SettleRestore states, however, the sequence counter (601) is disabled for a fixed number of PWM Oscillator cycles.

Assume in the example that the number of cycles is 128. In that case the two delay times would be 128 µsecs for a 1 Mhz power supply using this implementation. The total PLMDT cycle would be 262 µsecs: 2×128 µsecs+6 µsecs. Referring to the SaveLast (610 & 500) & Save Test (613 & 506) signals, this corresponds to a sample rate of about 3906 Hz.

Figure 7:
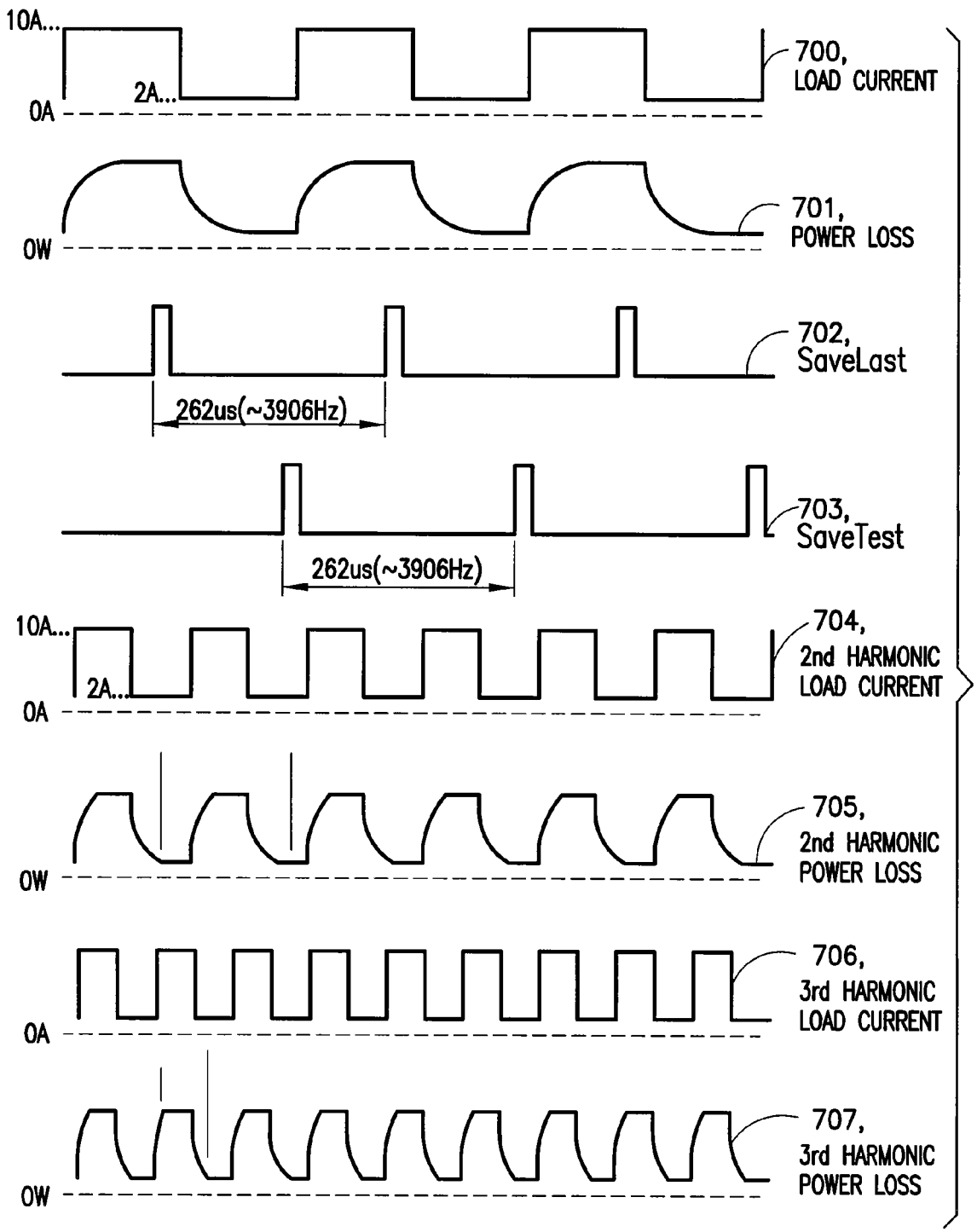
FIG. 7 shows how coherent load transients can cause false "better" or "worse" power loss indications in the prior art power loss minimizing dead time scheme.

With the typical pseudo random transient load present, for example, by a desk top computer CPU, there is as much probability of a load transient causing a false Better indication as there is for a false Worse indication. If the transient load frequency is coherent, however, every single better or worse indication could be a false one. FIG. 7 shows how this happens.

The load current of FIG. 7 has a toggle frequency identical to SaveLast & SaveTest (702 & 703). The power loss (701) is some function of the power supply current output. In this example every single test (509) will result in a "Better" indication, as the power loss at step 703 is less. If the load current (700) were shifted 180° with respect to PLMDT operation (702 & 703), then every single test (509) would result in a "Worse" indication. Of course this assumes that the load transient changes power loss enough to swamp out any effect of the actual dead time being tested. This would be a usual case.

704 & 705 show the relative immunity to even harmonics of the sample frequency, while 706 & 707 show the same susceptibility to odd harmonics as the fundamental. In practice there is some susceptibility with even harmonics and with even and odd sub harmonics. Response to harmonics extends until attenuated by the low pass filter 102 of FIG. 1.

In the case of the pseudorandom load transient previously described, the likelihood of a false Better is equal to that of a false Worse indication. Likewise the solution to this problem is to randomize the sample period so that on average the false indications cancel each other out in the same way as for a random load transient.

Figure 8:
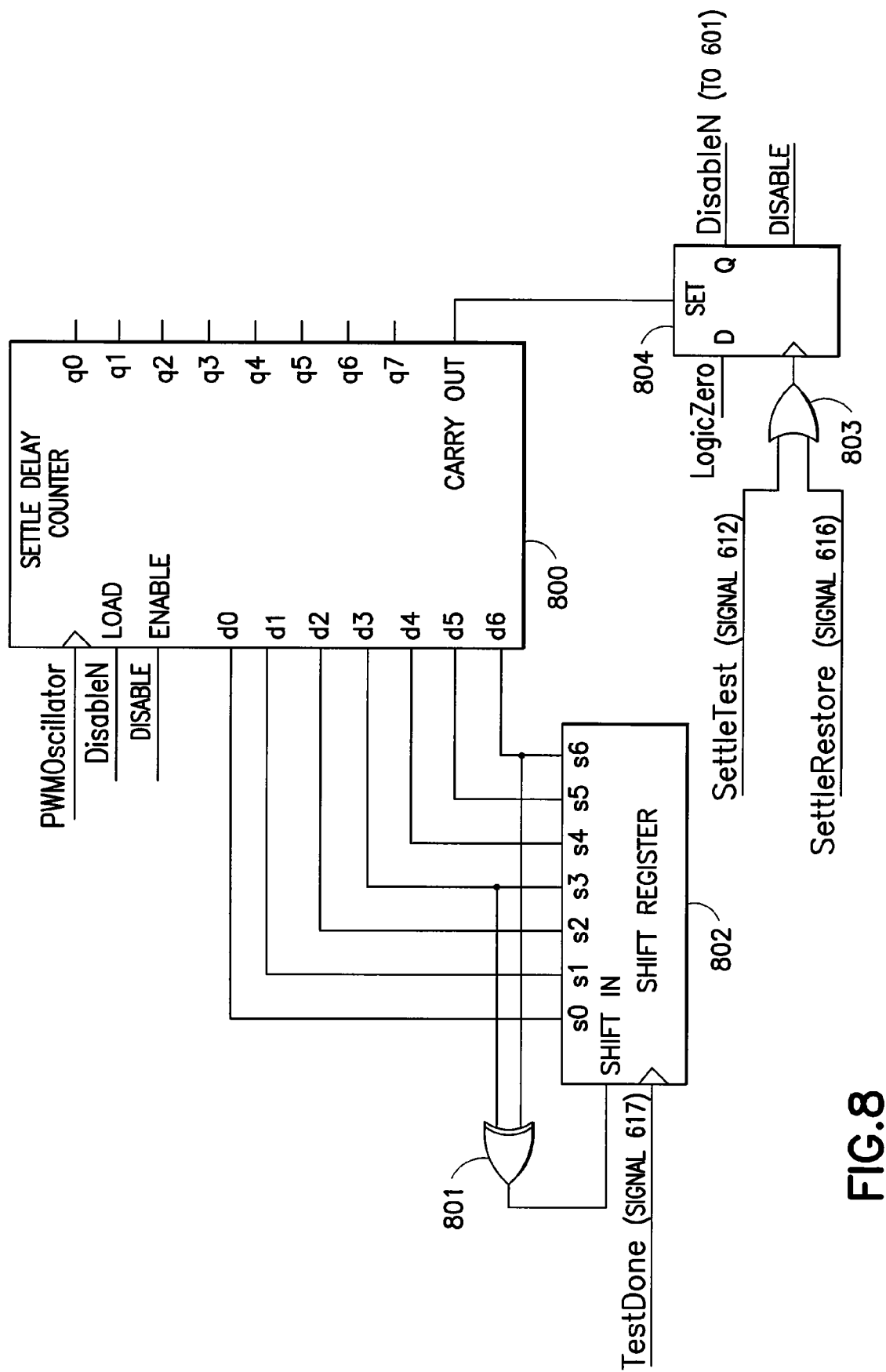
FIG. 8 shows one circuit implementation for compensating for coherent load transients.

The fundamental principle of this invention is a random or pseudo random sampling period. This principle is best demonstrated by changing the settling delay time (505, 514, 600, 612, 616) from being a fixed value, e.g. 128 µsec, to a pseudorandom value, e.g., between 128 µsec and 256 µsec. In that way, the position of SavTest and SaveLast will vary in a pseudorandom way with respect to the load transients. FIG. 8 shows schematically one method of accomplishing this.

In its normal state, Settle Delay Counter 800 data inputs are loaded from Shift Register 802 outputs. Counter 800 is an 8 bit counter, but only the lower 7 bits are loaded. This gives the counter a range from 128 to 256, resulting in a delay range of 128 µsec to 256 µsec with PWM Oscillator of 1Mhz.

Delay is initiated when SettleTest or SettleRestore clocks a zero into D flip flop 804. That disables sequence counter 601 and enables Settle Delay Counter 800. DisableN goes false on Carry Out of 800.

Exclusive or gate 801 and Shift Register 802 constitute a linear feedback shift register (LFSR). This circuit generates a pseudorandom 7 bit code at s0-thru-s6. The sequence is a function of the taps which feed exclusive OR gate 801 and the length of the sequence is a function of the number of bits. It is a repeating code, but a load transient exactly duplicating this code is so improbable that it can be ignored. Nevertheless, if there is any concern, the sequence length could be increased.

The result is that the sample frequency varies in a pseudorandom way from 1931 Hz-to-3906 Hz. In practice, this spreads the "noise" caused by the coherent load transient over the entire spectrum from virtually DC up to the cutoff of low pass filter 102 (FIG. 1). In order to overcome this increased noise floor, the number of Better samples (511) was increased from 129 (256/2+1) to 160 in the prototype. This number is exemplary only and it can be changed as necessary. The point is that noise immunity is increased by increasing the number.

Figure 9:
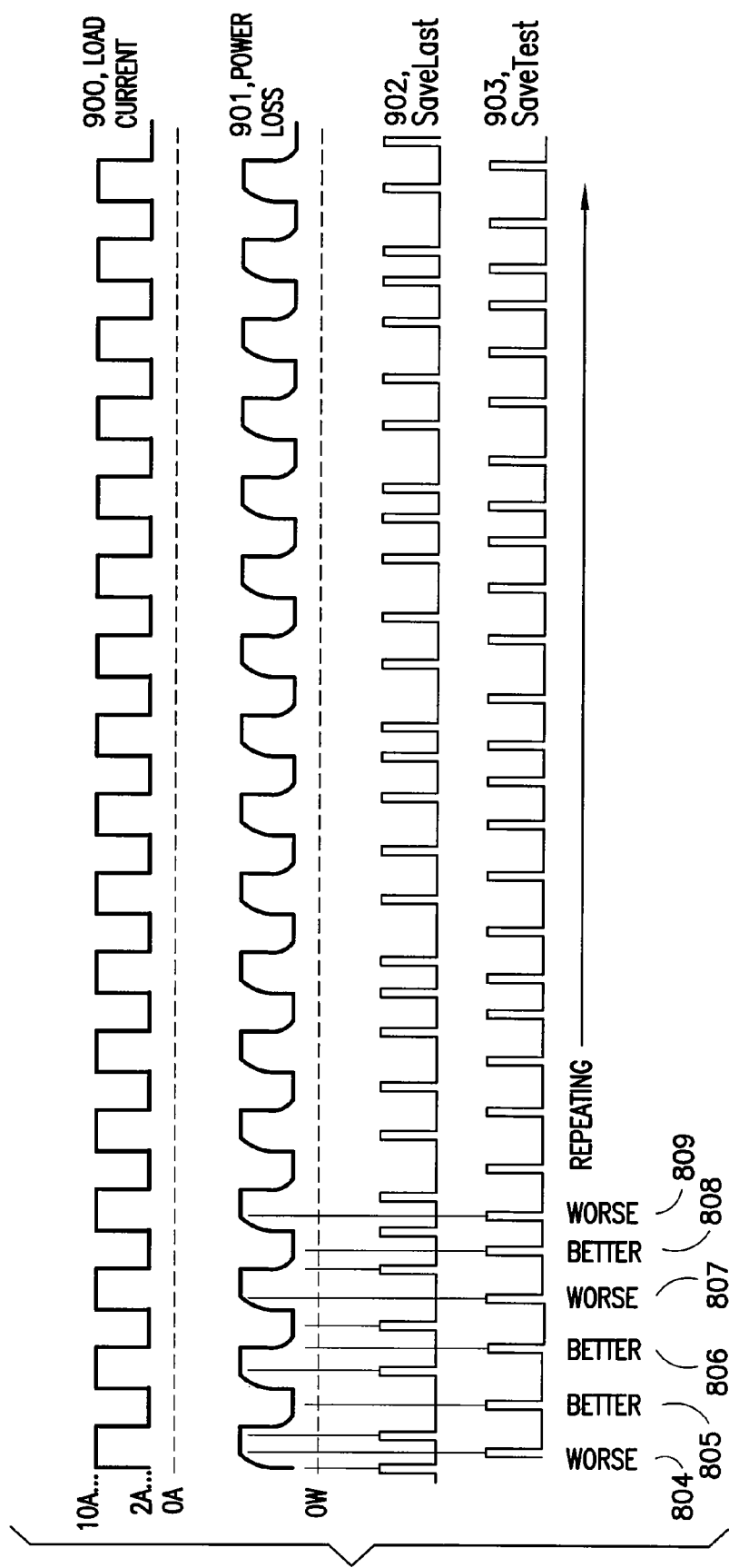
FIG. 9 is a simplified representation of the effect of using a random sampling interval on a PLMDT operation to compensate for the effect of coherent load transients.

Though a seven bit random sequence is longer and with finer resolution, FIG. 9 is a simplified representation of the effect of random sampling interval on PLMDT operation. Although load current (900) and resulting power loss (901) are coherent, the SaveLast (902) and SaveTest (903) signals are randomly spaced. This results in a random Better/Worse result (904-909) that when averaged over 256 tests (516) would not achieve the 160 Better (511) count necessary for an overall Better decision.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Apparatus for minimizing power losses associated with dead time between ON times of two series connected switches of a power converter connected across a supply potential, the apparatus comprising:
a control arrangement for monitoring a selected parameter associated with power loss during the dead time of the converter;
the control arrangement changing the dead time from a first dead time to a second dead time and comparing the selected parameter associated with power loss for the first and second dead times and determining which of the power losses associated with the two dead times is smaller;
a dead time implementing stage for implementing the two dead times; and
the control arrangement selecting the dead time associated with the smaller power loss and providing a signal to the dead time implementing stage to set the selected dead time, wherein the control arrangement comprises a module sampling a signal of the power converter related to the selected parameter associated with power loss at selected instants in time corresponding to the first and second dead times; and a processor for controlling timing of the sampling; and further comprising a comparator module for comparing power loss associated with the first and second dead times and for providing a signal indicating which dead time is associated with a smaller power loss and providing said signal to said processor to implement the dead time associated with the smaller power loss;
further comprising:
an error compensating circuit coupled to said sampling module and to said comparator to reduce offset errors introduced by either or both said sampling module and said comparator module.

2. The apparatus of claim 1, wherein the comparator module comprises an amplifier stage having a first input coupled to an output of the sampling module and a second input coupled to an input to the sampling module, and further comprising a comparator stage having a first input coupled to an output of the amplifier stage and a second input coupled to a reference voltage, further comprising a feedback circuit providing a correction signal to the amplifier stage when said sampling module samples the signal associated with power loss to maintain a preset offset voltage across the inputs of said amplifier stage thereby to cancel out offset errors introduced by said sampling module or comparator module.

3. The apparatus of claim 2, wherein said feedback circuit comprises:
a circuit for providing said correction signal as a function of an output of said amplifier stage.

4. The apparatus of claim 3, wherein said feedback circuit comprises a comparator circuit coupled to said amplifier stage output for determining if said amplifier stage output is within a specified range, and if outside the specified range, for changing the correction signal to drive the amplifier output into said specified range.

5. The apparatus of claim 4, wherein said comparator circuit comprises first and second comparators having respective reference voltages associated with said specified range and inputs coupled to said amplifier stage output.

6. The apparatus of claim 4, further comprising a bias voltage generating circuit coupled to an output of said comparator circuit for producing said correction signal as a function of said output of said comparator circuit.

7. The apparatus of claim 6, wherein the bias voltage generating circuit comprises an up/down counter whose counting direction is controlled by the output of said comparator circuit and a D/A converter for converting an output of said counter to an analog signal, said analog signal comprising said correction signal.

8. The apparatus of claim 7, further comprising a logic circuit coupling said comparator circuit output and a count enable input of said counter.

9. The apparatus of claim 1, wherein the dead time implementing stage implements a variable turn-off of a control signal to one of the switches and a variable turn-on of the control signal to said one of the switches.

10. The apparatus of claim 1, wherein the selected parameter comprises the duty cycle of a pulse width modulated control signal or pulse frequency modulated control signal adapted to drive a control terminal of at least one of the switches or an error signal used to control the PWM or PFM control signal.

11. The apparatus of claim 9, wherein the one of the switches performs a synchronous rectification function and the other switch is a control switch.

12. The apparatus of claim 1, wherein the sampling module comprises a sample and hold module.

13. The apparatus of claim 1, wherein the sampling module comprises an analog-to-digital converter and a digital memory.

14. Apparatus for minimizing power losses associated with dead time between ON times of two series connected switches of a power converter connected across a supply potential, the apparatus comprising:
a control arrangement for monitoring a selected parameter associated with power loss during the dead time of the converter;
the control arrangement changing the dead time from a first dead time to a second dead time and comparing the selected parameter associated with power loss for the first and second dead times and determining which of the power losses associated with the two dead times is smaller;
a dead time implementing stage for implementing the two dead times; and
the control arrangement selecting the dead time associated with the smaller power loss and providing a signal to the dead time implementing stage to set the selected dead time, further wherein the control arrangement tests all possible values of the dead time and each time a dead time associated with a smaller power loss is determined, the control arrangement provides said signal to the dead time implementing stage to set the selected dead time.

15. The apparatus of claim 14, wherein the control arrangement includes a counter that counts one step for each possible value of dead time that can be implemented by the dead time implementing stage.

16. The apparatus of claim 15, wherein the control arrangement tests the selected parameter for a plurality of times before setting the change in dead time, and further wherein, if at least a preset fraction of a preset number of the plurality of tests do not result in a smaller power loss, the control arrangement immediately stops testing for the plurality of times, maintains the dead time without change at its present value and restarts the test of the selected parameter for the plurality of times.

17. The apparatus of claim 16, further comprising an accumulator for maintaining a running total of a numerical difference between the power loss associated with the two dead times, and if said running total indicates said difference exceeds a preset value corresponding to a greater power loss, forcing a restart of a counting sequence counting said plurality of times.

18. The apparatus of claim 16, further wherein the control arrangement determines whether a preselected number of the plurality of times is mathematically possible for the power loss associated with the dead times to be smaller, and if not, immediately stops testing for the plurality of times.

19. The apparatus of claim 14, wherein the dead time implementing stage implements a variable turn-off of a control signal to one of the switches and a variable turn-on of the control signal to said one of the switches.

20. The apparatus of claim 14, wherein the selected parameter comprises the duty cycle of a pulse width modulated (PWM) control signal or pulse frequency modulated (PFM) control signal adapted to drive a control terminal of at least one of the switches or an error signal used to produce the pulse width modulated control signal or pulse frequency modulated control signal.

21. The apparatus of claim 19, wherein the one of the switches performs a synchronous rectification function and the other switch is a control switch.

22. The apparatus of claim 19, wherein the control arrangement comprises a module sampling a signal related to the selected parameter associated with power loss at selected instants in time corresponding to the first and second dead times; and a processor for controlling timing of the sampling.

23. The apparatus of claim 14, wherein the control arrangement comprises any one of a digital signal processor, microprocessor, microcontroller or logic circuit.

24. Apparatus for minimizing power losses associated with dead time between ON times of two series connected switches of a power converter connected across a supply potential, the apparatus comprising:
  a control arrangement for monitoring a selected parameter associated with power loss during the dead time of the converter;
  the control arrangement changing the dead time from a first dead time to a second dead time and comparing power loss associated with the selected parameter for the first and second dead times and determining which of the power losses associated with the two dead times is smaller;
  a dead time implementing stage for implementing the two dead times; and
  the control arrangement selecting the dead time associated with the smaller power loss and providing a signal to the dead time implementing stage to set the selected dead time, further wherein the control arrangement comprises a module sampling a signal of the power converter related to the selected parameter associated with power loss at random or pseudo random instants in time.

25. The apparatus of claim 24, wherein the sampling instants are randomized by changing the amount of a settling delay between sampling instants.

26. The apparatus of claim 25, further comprising a counter for generating a settling delay amount, the counter having inputs from a linear feedback shift register that produces a pseudo random number, said pseudo random number allowing said counter to count for a pseudo random period of time to provide a pseudo random settling delay.

* * * * *